: US 11,595,841 B2
(45) Date of Patent: Feb. 28, 2023

(12) United States Patent
Gao et al.

(10) Patent No

(54) METHOD AND DEVICE FOR INTERFERENCE MEASUREMENT

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 16/498,144

(22) PCT Filed: Mar. 31, 2017

(86) PCT No.: PCT/CN2017/078958
§ 371 (c)(1),
(2) Date: Sep. 26, 2019

(87) PCT Pub. No.: WO2018/176367
PCT Pub. Date: Oct. 4, 2018

(65) Prior Publication Data
US 2021/0120443 A1    Apr. 22, 2021

(51) Int. Cl.
*H04W 24/10*    (2009.01)
*H04B 17/336*   (2015.01)
*H04W 72/04*    (2023.01)
*H04W 72/08*    (2009.01)

(52) U.S. Cl.
CPC .......... *H04W 24/10* (2013.01); *H04B 17/336* (2015.01); *H04W 72/0493* (2013.01); *H04W 72/082* (2013.01)

(58) Field of Classification Search
CPC ....... H04W 24/00; H04W 72/00; H04B 17/00
See application file for complete search history.

(56) References Cited

U.S. PATENT DOCUMENTS

| 2013/0301448 | A1* | 11/2013 | Sayana | H04B 7/0626 |
| | | | | 370/252 |
| 2014/0010126 | A1* | 1/2014 | Sayana | H04J 3/1694 |
| | | | | 370/336 |
| 2014/0213210 | A1* | 7/2014 | Li | H04B 1/12 |
| | | | | 455/296 |
| 2015/0124717 | A1* | 5/2015 | Li | H04L 5/0048 |
| | | | | 370/329 |
| 2015/0222414 | A1* | 8/2015 | Tabet | H04L 5/0048 |
| | | | | 370/350 |

(Continued)

FOREIGN PATENT DOCUMENTS

| CN | 104081813 A | 10/2014 |
| CN | 104105120 A | 10/2014 |
| CN | 105191203 A | 12/2015 |

OTHER PUBLICATIONS

Definition of "Controller" from Dictionary.com.*
International Search Report for PCT/CN2017/078958 dated Jan. 4, 2018 [PCT/ISA/210].

*Primary Examiner* — Derrick W Ferris
*Assistant Examiner* — Sumitra Ganguly
(74) *Attorney, Agent, or Firm* — Sughrue Mion, PLLC

(57) ABSTRACT

Embodiments of the disclosure generally relate to interference measurement. A device determines an interference measurement pattern indicating distribution of resource elements allocated for interference measurement. Then, the device determines, based on the interference measurement pattern, an interference type for measuring interference on the resource elements.

5 Claims, 5 Drawing Sheets

(56) References Cited

U.S. PATENT DOCUMENTS

2016/0036542 A1* 2/2016 Gong .................... H04W 24/10
  370/329
2020/0028654 A1* 1/2020 Chen .................... H04L 1/0026

\* cited by examiner

METHOD AND DEVICE FOR INTERFERENCE MEASUREMENT

CROSS REFERENCE TO RELATED APPLICATIONS

This application is a National Stage of International Application No. PCT/CN2017/078958, filed on Mar. 31, 2017.

TECHNICAL FIELD

Embodiments of the present disclosure generally relate to the field of communications, and more particularly, to a method and device for interference measurement.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

Conventionally, in a Multi-User Multiple-Input Multiple-Output (MU-MIMO) system, a network device (for example, an eNB) uses multiple antenna ports to transmit signals, for example, reference signals such as Demodulation Reference Signal (DMRS), Channel State Information-Reference Signal (CSI-RS), and so on. A terminal device, such as user equipment (UE) in the system may receive downlink reference signals on an allocated resource region, including for example, one or more resource elements (REs). The allocated resource region is generally fixed. That is, once the resource region is allocated for transmitting the downlink reference signals, the network device uses this resource region to perform the transmission of the downlink reference signals to terminal devices.

However, if the resource region for transmitting the reference signals is configurable, it is possible to have a plurality of resource patterns indicating, for example, distribution of resource elements in the resource region. As such, the network device could use different resource patterns to transmit the downlink reference signals to the terminal devices. If the terminal devices are unaware of the corresponding resource pattern, it is difficult for the terminal devices to measure interference, let alone perform interference cancellation. As a result, interference in the system is increased, and transmission performance is reduced.

SUMMARY

In general, embodiments of the present disclosure provide a solution for solving interference measurement issue as discussed above.

In a first aspect of embodiments of the present disclosure, embodiments of the present disclosure provide a method performed by a device. The device determines an interference measurement (IM) pattern indicating distribution of resource elements allocated for interference measurement. Then, the device determines, based on the IM pattern, an interference type for measuring interference on the resource elements.

In a second aspect of embodiments of the present disclosure, embodiments of the disclosure provide a device. The device comprises: a controller configured to determine an IM pattern indicating distribution of resource elements allocated for interference measurement; and determine, based on the IM pattern, an interference type for measuring interference on the resource elements.

In a third aspect of embodiments of the present disclosure, a device is provided. The device includes: a processor and a memory. The memory contains instructions executable by the processor, whereby the processor being adapted to cause the device to perform the method according to the first aspect of the present disclosure.

In a fourth aspect of embodiments of the present disclosure, embodiments of the present disclosure provide method performed by a terminal device. The terminal device receives information about an interference type for measuring interference caused by signal transmission. Then, the terminal device measures interference on resource elements allocated for signal transmission based on the interference type.

In a fifth aspect of embodiments of the present disclosure, embodiments of the disclosure provide a terminal device. The terminal device comprises: a transceiver configured to receive information about an interference type for measuring interference caused by signal transmission; and a controller configured to measure interference on resource elements allocated for signal transmission based on the interference type.

In a sixth aspect of embodiments of the present disclosure, a terminal device is provided. The terminal device includes: a processor and a memory. The memory contains instructions executable by the processor, whereby the processor being adapted to cause the terminal device to perform the method according to the fourth aspect of the present disclosure.

According to embodiments of the present disclosure, an interference type is determined to indicate how to measure interference on resource elements of a configurable resource region. Based on the interference type, the terminal device can correctly perform interference measurement on the resource elements. In this way, interference in the system can be reduced, and transmission performance can be increased.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
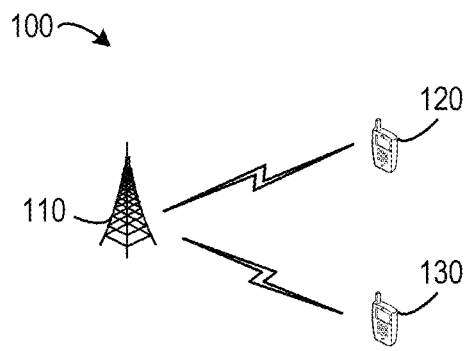
FIG. 1 shows a schematic diagram 100 of a wireless communication network.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio Access (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a NodeB in NR (gNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "device" refers to a network device or a terminal device in a communication network.

Now some exemplary embodiments of the present disclosure will be described below with reference to the figures. Reference is first made to FIG. 1, which illustrates schematic diagram of a communication system 100 according to embodiments of the present disclosure.

In the communication system 100, there illustrate a network device (for example, an eNB) 110 that communicates with two terminal devices (for example, UEs) 120 and 130. The network device 110 allocates resource elements to the terminal devices 120 and 130, respectively, to transmit downlink reference signals, such as DMRS, CSI-RS, and the like. In the embodiment, the resource elements are configurable. Thus, the resource elements allocated to the terminal device 120 may be the same as, different from, or overlapped with the resource elements allocated to the terminal device 130. If terminal device 120 is unaware of the resource elements allocated to the terminal device 130, it cannot measure the interference caused by transmission of the reference signals to the terminal device 130 and thus the reception of reference signals at the terminal device 120 is liable to be negatively affected. As such, transmission performance is undesirably reduced.

In order to solve the above and other potential problems, embodiments of the present disclosure provide solutions for solving the interference measuring issue. In the proposed solution, a device determines an IM pattern indicating distribution of resource elements allocated for interference measurement. Then, the device determines an interference type for measuring interference on the resource elements based on the IM pattern. In this way, it is possible for the terminal device 120 to accurately measure the interference on the resource elements allocated to the terminal device 130. As such, the interference can be reduced effectively and transmission performance can be increased accordingly.

Figure 2:
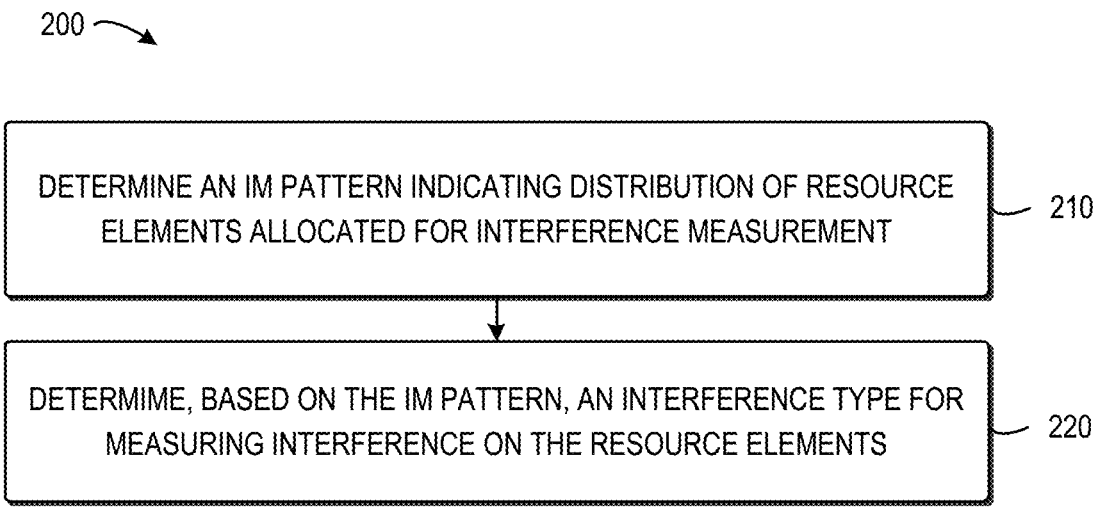
FIG. 2 shows a flowchart of a method 200 of measuring interference in accordance with an embodiment of the present disclosure.

More details of embodiments of the present disclosure will be discussed with reference to FIGS. 2 to 7 below. FIG. 2 shows a flowchart of a method 200 of measuring interference in accordance with an embodiment of the present disclosure. With the method 200, the above and other potential deficiencies in the conventional approaches can be overcome. It would be appreciated by those skilled in the art that the method 200 may be implemented by a device, such as a network device 110, a terminal device 120 or 130, or other suitable devices.

The method 200 is entered at 210, where the device determines an IM pattern. The IM pattern indicates distribution of resource elements allocated for interference measurement. The distribution of the resource elements may include density, locations and/or other suitable attributes of the resource elements. The IM pattern may include one or more resource elements (REs) within a resource block (RB) or across adjacent RBs, for example, physical resource blocks (PRBs). The interference is to be measured within the configured REs in the IM pattern.

Figure 3A:
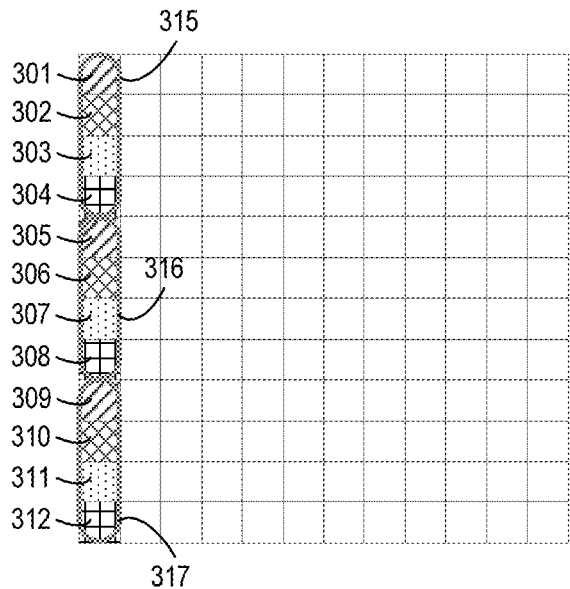
FIGS. 3A-3G show diagrams of IM patterns in accordance with embodiments of the present disclosure, respectively.

FIGS. 3A-3G show diagrams of IM patterns in accordance with embodiments of the present disclosure, respectively. In the example of FIG. 3A, an IM pattern is illustrated as including 12 REs 301-312. The REs 301-312 are divided into three groups. As shown, a first group 315 includes REs 301-304, a second group 316 includes REs 305-308, and a third group 317 includes REs 309-312. For purpose of discussion, these groups are also referred to as "RE groups" hereafter.

Figure 3B:
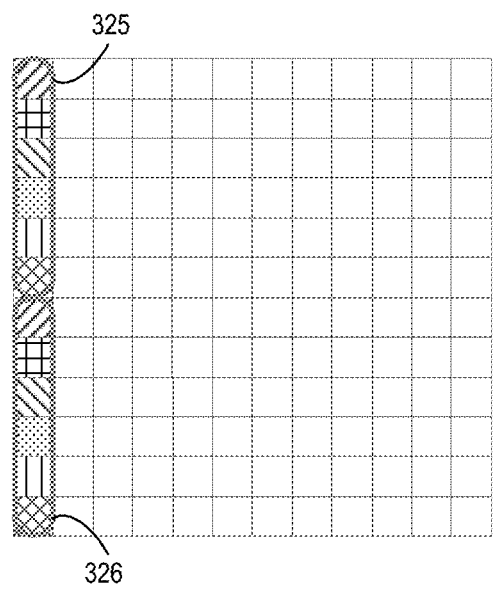
Figure 3C:
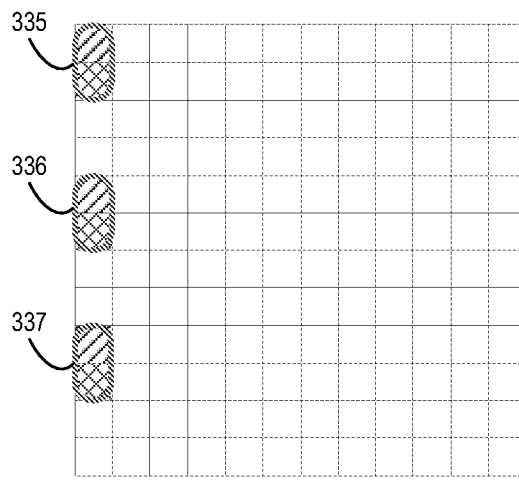
Figure 3D:
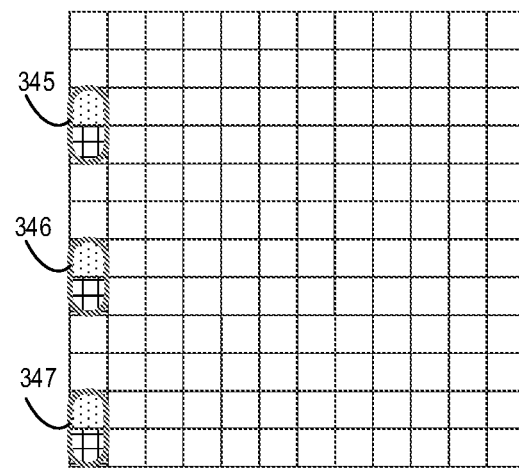
Figure 3E:
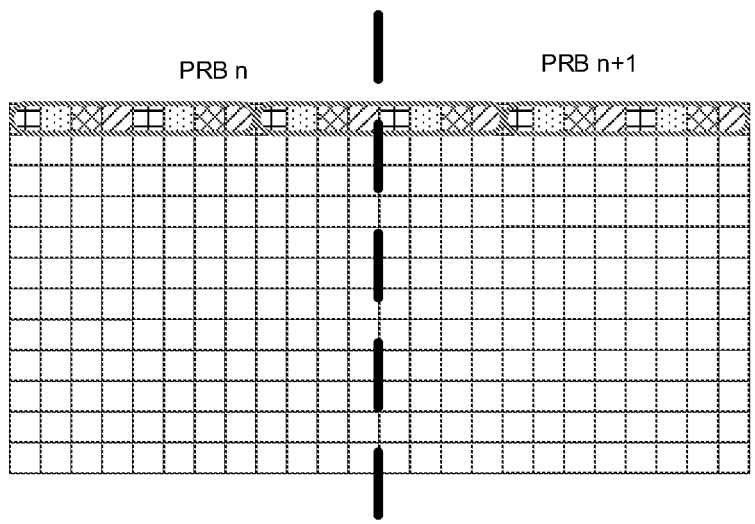
Figure 3F:
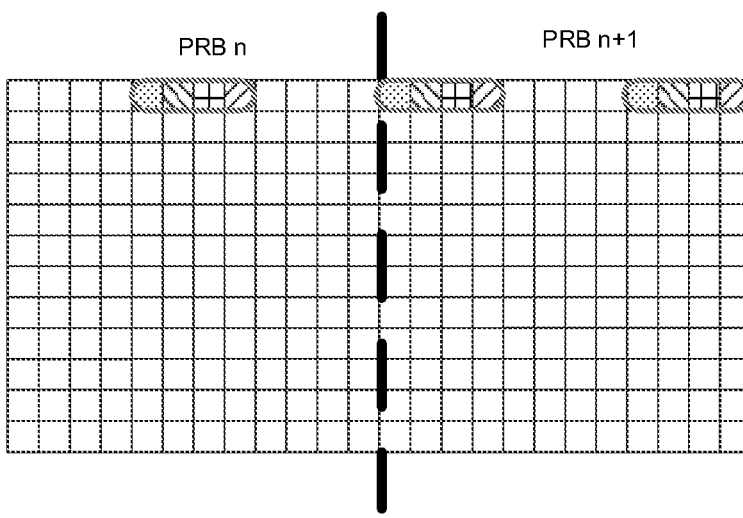
Figure 3G:
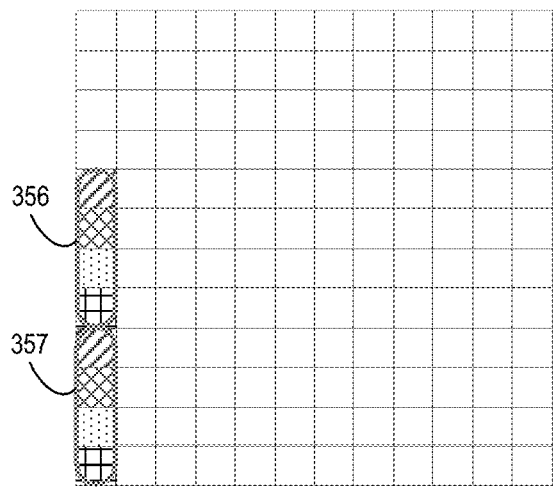

In the example of FIG. 3B, it is illustrated an IM pattern including REs 301-312 divided into two groups 325 and 326. In the example of FIG. 3C, it is illustrated an IM pattern including 6 REs 301-302, 305-306 and 309-310. These REs are divided into three groups 335, 336 and 337, respectively. In the example of FIG. 3D, it is illustrated another IM pattern including 6 REs 303-304, 307-308 and 311-312. These REs are divided into three groups 345, 346 and 347, respectively. In the example of FIG. 3E, it is illustrated an IM pattern including 24 REs across two PRBs, namely, PRB n and PRB n+1. These REs are divided into three groups, and each group includes 8 REs. In the example of FIG. 3F, it is illustrated an IM pattern including 12 discontinuous REs across PRB n and PRB n+1. These REs are divided into three groups, and each group includes 4 REs. In the example of FIG. 3G, it is illustrated an IM pattern including 8 REs 305-312 which are divided into two groups 356 and 357.

It is to be understood that the IM patterns illustrated in FIGS. 3A-3G are discussed for purpose of example, rather than suggesting any limitation. Those skilled in the art would readily appreciate that the IM pattern may have many other suitable forms and may include different groups of REs.

The density may indicate repetitions of a single group of resource elements. For example, if there are 12 resource elements which can be divided into 3 groups, and each of the groups includes 4 resource elements corresponding to the same antenna ports. In this case, there are 3 repetitions of the same group of resource elements, and thus the density may be determined as 3. In the example illustrated in FIG. 3A, it is assumed that the RE groups 315, 316 and 317 are each allocated for downlink reference signal transmission of the terminal device 130. If the antenna ports for transmitting signals correspond to the REs in each of the three groups 315, 316 and 317 in the same way, it may be determined that the three RE groups are repetitive. More specifically, if REs 301-304 are allocated to antenna ports 1-4 for transmitting downlink reference signals to terminal device 120, REs 305-308 are allocated to antenna ports 1-4 for transmitting downlink reference signals to terminal device 120, and REs 309-312 are also allocated to antenna ports 1-4 for transmitting downlink reference signals to terminal device 120, then it can be determined that there are 3 repetitions (that is, RE groups 315, 316 and 317) of the same group 315 of resource elements, and the density is 3.

In another embodiment, for example, if there are 12 resource elements which can be divided into 3 groups, and each of the groups includes 4 resource elements corresponding to the different antenna ports. In this case, there are 3 non-repetitions of the group of resource elements. In the example illustrated in FIG. 3A, it is assumed that the RE group 315 is allocated for downlink reference signal transmission of the terminal device 130, RE group 316 is allocated for uplink or downlink reference signal or data transmission of the terminal device 120, and RE group 317 is allocated for uplink or downlink reference signal or data transmission of the terminal device 120. If the antenna ports for transmitting signals (the reference signal or the data) correspond to the REs in each of the three groups 315, 316 and 317 in the different ways, it may be determined that the three RE groups are non-repetitive.

The locations may include time positions and/or frequency positions of the resource elements, for example, but not limited to, the slot(s), the subframe(s), the frequency band(s), and/or PRB(s) occupied by the resource elements.

According to embodiments of the present disclosure, the IM pattern may be determined in a variety of ways. By way of example, the device may obtain information about density and/or locations of the resource elements and determine the IM pattern based on the obtained information.

In some embodiments, if the device is the network device 110, at 210, the network device 110 may allocate a first set of resource elements to the terminal device 120 and a second set of resource elements to the terminal device 130 for interference measurement, and then determine the IM pattern based on the allocated resource elements. The first set of resource elements may include resource elements used for transmitting signals, such as the reference signals, data, or the like, to terminal devices (for example the terminal device 130) other than the terminal device 120. The second set of resource elements may include resource elements used for transmitting signals, such as the reference signals, data, or the like, to terminal devices (for example the terminal device 120) other than the terminal device 130. The first set of resource elements may be the same as, different from, or overlapped with the second set of resource elements.

In some embodiments, if the device is the terminal device 120, it may receive, for example, via a Radio Resource Control (RRC) signaling, information about the IM pattern from the network device, and determine the IM pattern from the received information at 210.

At 220, the device determines an interference type for measuring interference on the resource elements based on the IM pattern. The interference type is associated with the relationship of the REs in an IM pattern and may be implemented as one of different processing types of the interference measured on the REs. In particular, an interference type may indicate how to deal with interference measured on the resource elements. With respect to different interference types, a receiving device, for example, in downlink transmission, the terminal device 120 or 130 may obtain the interference with different processing procedures.

According to embodiments of the present disclosure, the interference type may be determined in several ways. In some embodiments, the device may determine a relationship between the resource elements and antenna ports for transmitting signals based on the IM pattern. Then, the device may determine the interference type based on the relationship. For example, if the relationship indicates that the transmitted signals correspond to repetitive groups of antenna ports, the interference type may be determined as indicating that interferences measured (also referred to as "interference measurements") on the resource elements are dependent. In this case, the interference measurements may be further processed to derive the actual interference to the terminal device 120 or 130. For instance, the interference measurements may be averaged according to repetitions of groups of resource elements.

On the other hand, if the relationship indicates that the transmitted signals correspond to non-repetitive groups of antenna ports, the interference type may be determined as indicating that interferences measured on the resource elements are independent. In this case, the interference measurements may be summed, weighted, and/or processed by any other suitable means.

In embodiments of the present disclosure, the interference type may be implemented as a variety of ways, for example, according to the following Table 1. If the interference type is 0, it means that the interferences measured on the resource elements are dependent. If the interference type is 1, it means that the interferences measured on the resource elements are independent.

TABLE 1

| Interference Type | Description |
| --- | --- |
| 0 | Interference is dependent |
| 1 | Interference is independent |

As for the receiving device, if the received interference type is 0, it may measure interference on the resource elements dependently, for example, detect the interference power and calculates the average power with the different REs or RE groups. If the interference type is 1, the receiving device may measure interference on the resource elements independently, for example, detect the interference power and calculates summation power with the different REs or RE groups. Based on the interference type, the receiving device can correctly perform interference measurement on the resource elements. In this way, interference in the system can be reduced, and transmission performance can be increased.

According to embodiments of the present disclosure, if the device is the network device 110, method 200 may optionally include an action about transmission of information about the interference type. The network device 110 may transmit the information about the interference type together with the information about the IM pattern, or the transmissions of both information about the IM pattern and the interference type may be separate.

Figure 4:
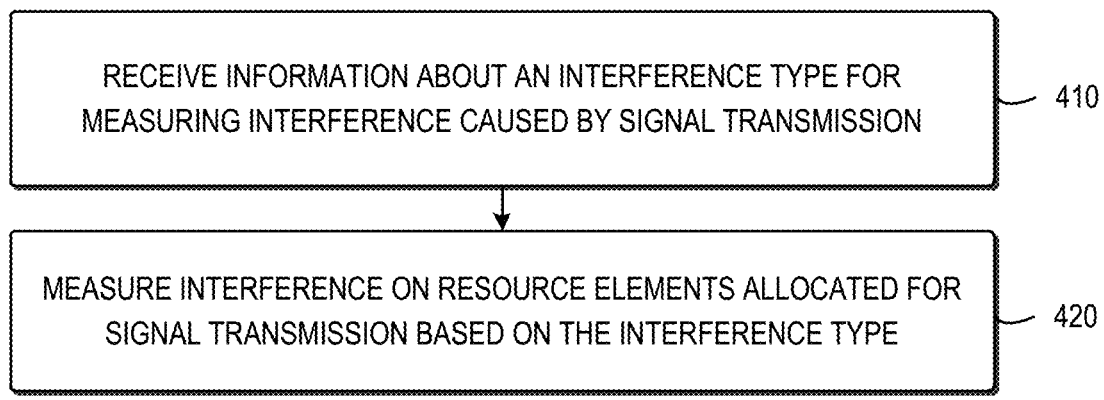
FIG. 4 shows a flowchart of a method 400 of measuring interference in accordance with an embodiment of the present disclosure.

Now reference is made to FIG. 4, which shows a flowchart of a method 400 of measuring interference in accordance with an embodiment of the present disclosure. It would be appreciated by those skilled in the art that the method 400 may be implemented at a receiving device, such as the terminal device 120 or 130, or other suitable devices. For purpose of illustration, the terminal device 120 is discussed as the receiving device in the following embodiments.

The method 400 is entered at 410, where the terminal device 120 receives information about an interference type for measuring interference caused by signal transmission. The interference type may be determined based on an IM pattern indicating distribution of the resource elements. The determination of the interference type can be found in embodiments discussed with respect to FIG. 2 and is thus omitted herein.

At 420, the terminal device 120 measures interference on resource elements allocated for signal transmission based on the interference type. In some embodiments, if the interference type indicates that interferences measured on the resource elements are dependent, the terminal device 120 may measure interferences on the resource elements based on a relationship between the resource elements and antenna ports for transmitting signals.

In an embodiment, the terminal device 120 may determine repetitive groups of antenna ports based on the relationship, and average the measured interferences on resource elements corresponding to the repetitive groups of antenna ports. Still referring FIG. 3A, in this example, the terminal device 120 may determine that the RE groups 315, 316 and 317 are the repetitive groups. Thus, the terminal device 120 may calculate an average of a first interference measured on the resource elements 301-304, a second interference measured on the resource elements 305-308, and a third interference measured on the resource elements 309-312.

On the other hand, if the interference type indicates that interferences measured on the resource elements are independent, the terminal device 120 may measure interferences on the resource elements independently, for example, letting the measured interferences alone, calculating a sum of them, or the like.

Figure 5:
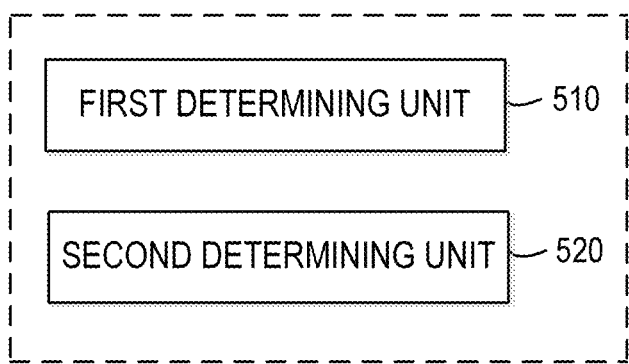
FIG. 5 shows a block diagram of an apparatus 500 implemented at a device in accordance with an embodiment of the present disclosure.

Now reference is made to FIG. 5, which shows a block diagram of an apparatus 500 in accordance with an embodiment of the present disclosure. It would be appreciated that the apparatus 500 may be implemented at a device, for example, the network device 110, the terminal device 120 or 130, or any other suitable device.

As shown, the apparatus 500 includes a first determining unit 510 and a second determining unit 520. The first determining unit 510 is configured to: determine an IM pattern indicating distribution of resource elements allocated for interference measurement. The second determining unit 520 is configured to: determine, based on the IM pattern, an interference type for measuring interference on the resource elements.

In an embodiment, the first determining unit 510 may be further configured to: obtain information about at least one of density and locations of the resource elements; and determine the IM pattern based on the information.

In an embodiment, the second determining unit 520 may be further configured to: determine, based on the IM pattern, a relationship between the resource elements and antenna ports for transmitting signals; and determine the interference type based on the relationship.

In an embodiment, the second determining unit 520 may be further configured to: in response to that the relationship indicates that the transmitted signals correspond to repetitive groups of antenna ports, determine the interference type as indicating that interferences measured on the resource elements are dependent; and in response to that the relationship indicates that the transmitted signals correspond to non-repetitive groups of antenna ports, determine the interference type as indicating that interferences measured on the resource elements are independent.

In an embodiment, the device is a network device, and the apparatus 500 may further comprise a transmitting unit configured to transmit information about at least one of the IM pattern and the interference type to a terminal device.

Figure 6:
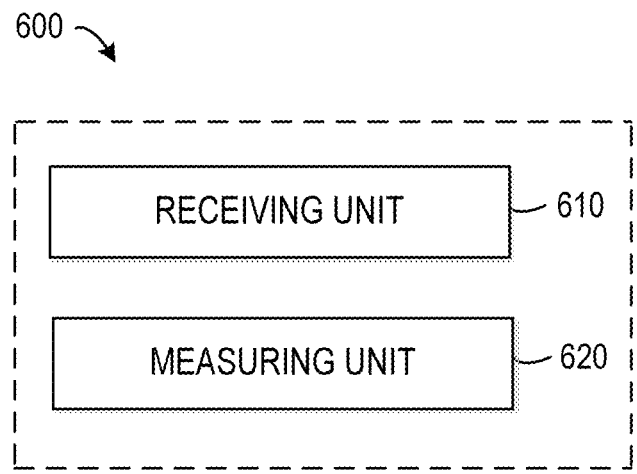
FIG. 6 shows a block diagram of an apparatus 600 implemented at a terminal device in accordance with an embodiment of the present disclosure.

FIG. 6 shows a block diagram of an apparatus 600 in accordance with an embodiment of the present disclosure. It would be appreciated that the apparatus 600 may be implemented at a device, for example, the terminal device 120 or 130, or any other suitable device.

As shown, the apparatus 600 includes a receiving unit 610 and a measuring unit 620. The receiving unit 610 is configured to receive information about an interference type for measuring interference caused by signal transmission. The measuring unit 620 is configured to measure interference on resource elements allocated for signal transmission based on the interference type.

In an embodiment, the measuring unit 620 may be further configured to: in response to that the interference type indicates that interferences measured on the resource elements are dependent, measure interferences on the resource elements based on a relationship between the resource elements and antenna ports for transmitting signals; and in response to that the interference type indicates that interferences measured on the resource elements are independent, measure interferences on the resource elements independently.

In an embodiment, the measuring unit 620 may be further configured to: determine repetitive groups of antenna ports based on the relationship; and average the measured interferences on resource elements corresponding to the repetitive groups of antenna ports.

In an embodiment, the interference type may be determined based on an IM pattern indicating distribution of the resource elements.

It is also to be noted that the apparatus 500 or 600 may be respectively implemented by any suitable technique either known at present or developed in the future. Further, a single device shown in FIG. 2 or 4 may be alternatively implemented in multiple devices separately, and multiple separated devices may be implemented in a single device. The scope of the present disclosure is not limited in these regards.

It is noted that the apparatus 500 or 600 may be configured to implement functionalities as described with reference to FIG. 2 or 4. Therefore, the features discussed with respect to the method 200 may apply to the corresponding components of the apparatus 500, and the features discussed with respect to the method 400 may apply to the corresponding components of the apparatus 600. It is further noted that the components of the apparatus 500 or 600 may be embodied in hardware, software, firmware, and/or any combination thereof. For example, the components of the apparatus 500 or 600 may be respectively implemented by a circuit, a processor or any other appropriate device. Those skilled in the art will appreciate that the aforesaid examples are only for illustration not limitation.

In some embodiment of the present disclosure, the apparatus 500 or 600 may comprise at least one processor. The at least one processor suitable for use with embodiments of the present disclosure may include, by way of example, both general and special purpose processors already known or developed in the future. The apparatus 500 or 600 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 500 to at least perform according to the method 200 as discussed above and to cause the apparatus 600 to at least perform according to the method 400 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 5 or 6 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 7:
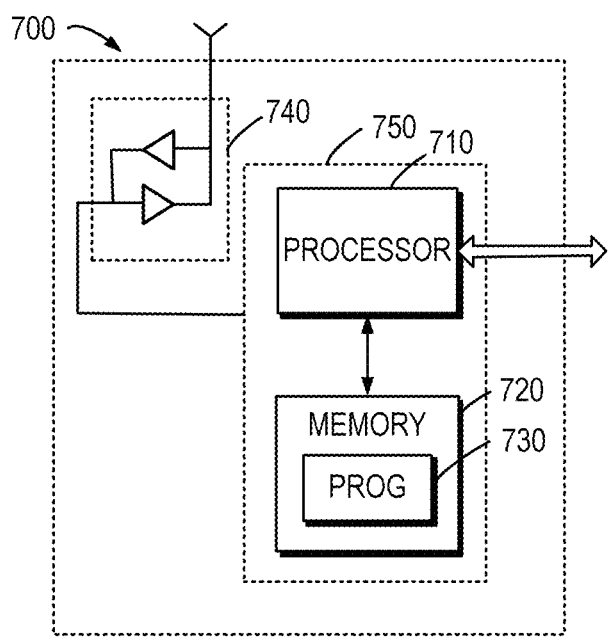
FIG. 7 shows a simplified block diagram of a device 700 that is suitable for implementing embodiments of the present disclosure.

FIG. 7 is a simplified block diagram of a device 700 that is suitable for implementing embodiments of the present disclosure. As shown, the device 700 includes one or more processors 710, one or more memories 720 coupled to the processor(s) 710, one or more transmitters and/or receivers (TX/RX) 740 coupled to the processor 710.

The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 720 stores at least a part of a program 730. The TX/RX 740 is for bidirectional communications. The TX/RX 740 has at least one antenna to facilitate communication, though in practice a terminal device or a network device mentioned in this disclosure may have several ones. The communication interface may represent any interface that is necessary for communication with other network elements.

The program 730 is assumed to include program instructions that, when executed by the associated processor 710, enable the device 700 to operate in accordance with the embodiments of the present disclosure, as discussed herein with reference to FIGS. 2 and 4. That is, embodiments of the present disclosure can be implemented by computer software executable by the processor 710 of the device 700, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method implemented at a device, comprising:
    determining an interference measurement (IM) pattern indicating distribution of resource elements allocated for interference measurement; and
    determining, based on the IM pattern, an interference type for measuring interference on the resource elements,
    wherein determining the interference type based on the IM pattern comprises:
    determining, based on the IM pattern, a relationship between the resource elements and antenna ports for transmitting signals; and
    determining the interference type based on the relationship, and
    wherein determining the interference type based on the relationship comprises:
    in response to that the relationship indicates that the transmitted signals correspond to repetitive groups of antenna ports, determining the interference type as indicating that interferences measured on the resource elements are dependent; and
    in response to that the relationship indicates that the transmitted signals correspond to non-repetitive groups of antenna ports, determining the interference type as indicating that interferences measured on the resource elements are independent.

2. The method according to claim 1, wherein determining the IM pattern comprises:
    obtaining information about at least one of density and locations of the resource elements; and
    determining the IM pattern based on the information.

3. The method according to claim 1, wherein the device is a network device, and the method further comprises:
    transmitting information about at least one of the IM pattern and the interference type to a terminal device.

4. A method implemented at a terminal device, comprising:
    receiving information about an interference type for measuring interference caused by signal transmission; and
    measuring interference on resource elements allocated for signal transmission based on the interference type,
    wherein measuring interference on the resource elements based on the interference type comprises:
    in response to that the interference type indicates that interferences measured on the resource elements are dependent, measuring interferences on the resource elements based on a relationship between the resource elements and antenna ports for transmitting signals; and
    in response to that the interference type indicates that interferences measured on the resource elements are independent, measuring interferences on the resource elements independently, and
    wherein measuring interferences on the resource elements based on a relationship between the resource elements and antenna ports for transmitting signals comprises:
    determining repetitive groups of antenna ports based on the relationship; and
    averaging the measured interferences on resource elements corresponding to the repetitive groups of antenna ports.

5. The method according to claim 4, wherein the interference type is determined based on an interference measurement (IM) pattern indicating distribution of the resource elements.

* * * * *